United States Patent
Kamatani

(10) Patent No.: US 6,215,743 B1
(45) Date of Patent: Apr. 10, 2001

(54) DATA RECORDING AND REPRODUCING METHOD FOR MULTI-LAYERED OPTICAL DISK SYSTEM

(75) Inventor: Yasuo Kamatani, Sagamihara (JP)

(73) Assignee: LaserDynamics, Inc., Tokyo (JP)

( * ) Notice: Subject to any disclaimer, the term of this patent is extended or adjusted under 35 U.S.C. 154(b) by 0 days.

(21) Appl. No.: 09/370,308

(22) Filed: Aug. 9, 1999

Related U.S. Application Data

(63) Continuation of application No. 08/720,531, filed on Sep. 30, 1996, now Pat. No. 5,982,723.

(51) Int. Cl.[7] .................................................. G11B 5/09
(52) U.S. Cl. ................................. 369/47.15; 369/53.37; 369/53.45; 369/59.13
(58) Field of Search ............................... 369/47, 48, 50, 369/54, 58, 32, 33, 53, 94, 47.39, 47.55, 47.15, 53.2, 53.31, 53.34, 53.37, 53.45, 59.13, 59.14

(56) References Cited

U.S. PATENT DOCUMENTS

| | | | |
|---|---|---|---|
| 4,853,915 | * | 8/1989 | Takasago et al. .................. 369/58 X |
| 5,010,539 | * | 4/1991 | Terashima et al. ................ 369/58 X |
| 5,177,728 | * | 1/1993 | Otsubo et al. ..................... 369/58 X |
| 5,249,170 | * | 9/1993 | Yoshimaru et al. ............... 369/58 X |
| 5,289,451 | * | 2/1994 | Ashinuma et al. .................... 369/58 |
| 5,315,570 | * | 5/1994 | Miura et al. ....................... 369/58 X |
| 5,436,878 | * | 7/1995 | Yamaguchi et al. .............. 369/58 X |
| 5,715,355 | * | 2/1998 | Yonemitsu et al. .................... 369/48 |

* cited by examiner

*Primary Examiner*—Paul W. Huber
(74) *Attorney, Agent, or Firm*—Trop, Pruner & Hu, P.C.

(57) ABSTRACT

A data recording and reproducing method for an optical disk data storage system to record data compressed at different data compression rate according to an operator's specification, and to reproduce the recorded data by decompressing. According to the operator's indication, the data is recorded at certain data compression rate in indicated area. The information of the data compression rate and the recorded area is stored as a total of contents (TOC) data. The TOC data is reproduced and stored in a memory after the optical disk is loaded. The recorded data is reproduced by selecting a decoding circuit to decompress the data. The decoding circuit is selected by referring the TOC data to identify data compression rate of the recorded data. Also the TOC data is referred to identify read-in and read-out region of the recorded data. The position of a pick-up when the data recording is started and ended, is recorded as the TOC data to provide random access capability for the data reproduction.

12 Claims, 3 Drawing Sheets

DATA RECORDING AND REPRODUCING METHOD FOR MULTI-LAYERED OPTICAL DISK SYSTEM

This is a continuation of U.S. patent application Ser. No. 08/720,531, entitled, "DATA RECORDING AND REPRODUCING METHOD FOR MULTI-LAYERED OPTICAL DISK SYSTEM," filed on Sep. 30, 1996, now U.S. Pat. No. 5,982,723.

BACKGROUND OF THE INVENTION

1. Field of the Invention

This invention relates to an optical data recording and reproducing method. More specifically, this invention relates to an optical disk recording and reproducing method which makes possible to record data encoded by different encoding circuit at different data compression rate and to reproduce the data.

2. Description of the prior Art

Initialized by the vast increase in information that needs to be processed, optical data storage system have become very important system particularly because of their high storage density per area. Most of the recent optical information storage systems rotating single optical disk are used on which the information is digitally stored in concentric circular tracks in an ordered, predefined manner to allow chronological fast reading and fast random access to desired pits of data.

In order to accomplish even more storage capacity of optical disk systems for enormous information processing, such as video or picture communication like so called video-on-demand service, multiple disk systems have been proposed. An optical disk system equipped with two or more data layers may in theory be accessed as different disks by changing the focal point with moving lens. Example of this type of state-of-the-art include U.S. Pat. No. 5,202,875 issued Apr. 13, 1993 to Rosen et al.; Japanese Published Application, 63-276732 published Nov. 15, 1988 by Watanabe, et al.

Such a multiple disk recording and reading system is applied to varied optical disk information storage system. For example, a digital video disk (DVD) systems for home entertaining is one of the typical application. The mentioned advantage of vast storage capacity may contribute especially for video signal transmission. In order to record the video data efficiently onto the optical disk, a video data compression technique is one of the key technologies. A standardized video data compression rate has been proposed, which is called MPEG (Moving Picture Experts Group). However, for the home entertaining purposes, a more flexible function is required. The ability to record data at different data compression rates and to reproduce the recorded data, must be provided.

SUMMARY OF THE INVENTION

The present invention has for its object to provide a multi-layered optical disk recording and reproducing system which is able to record data encoded by different encoding circuits at different data compression rates and to reproduce the data by selected decoding circuit.

The object of the present invention can be achieved by an optical data recording and reproducing method, the recording method comprising the steps of: loading a multi-layered optical disk which has M data layers (wherein M is an integer greater than 1), receiving an operator's signal to record data on an Nth data layer of the multi-layered optical disk at a certain data compression rate (wherein N is an integer greater than 1 and not greater than M), operating a routing circuit to transmit the data to a determined encoding circuit in order to compress the data at a predetermined data compression rate, recording the data on predetermined position at the predetermined data compression rate, and rewriting total of contents (TOC) data to record data about the data compression rate of the newly recorded data.

And the object of the present invention also can be achieved by an optical data recording and reproducing method, the reproducing method comprising the steps of: loading a multi-layered optical disk, which has M data layers (wherein M is an integer greater than 1), reproducing a total of contents (TOC) data recorded in the multi-layered optical disk, storing the reproduced TOC data in a memory, receiving a operator's signal to reproduce selected data stored in the multi-layered optical disk, referring to the TOC data stored in the memory to identify the data compression rate of the selected data, and operating a routing circuit to transmit a readout signal of the selected data to the determined encoding circuit in order to decompress the selected data.

For a fuller understanding of the nature and advantages of the present invention reference should be made to the following detailed description taken in conjunction with the accompanying drawings.

DETAILED DESCRIPTION OF THE PREFERRED EMBODIMENT

Embodiments of the present invention will be explained with reference to the drawings.

Figure 1:
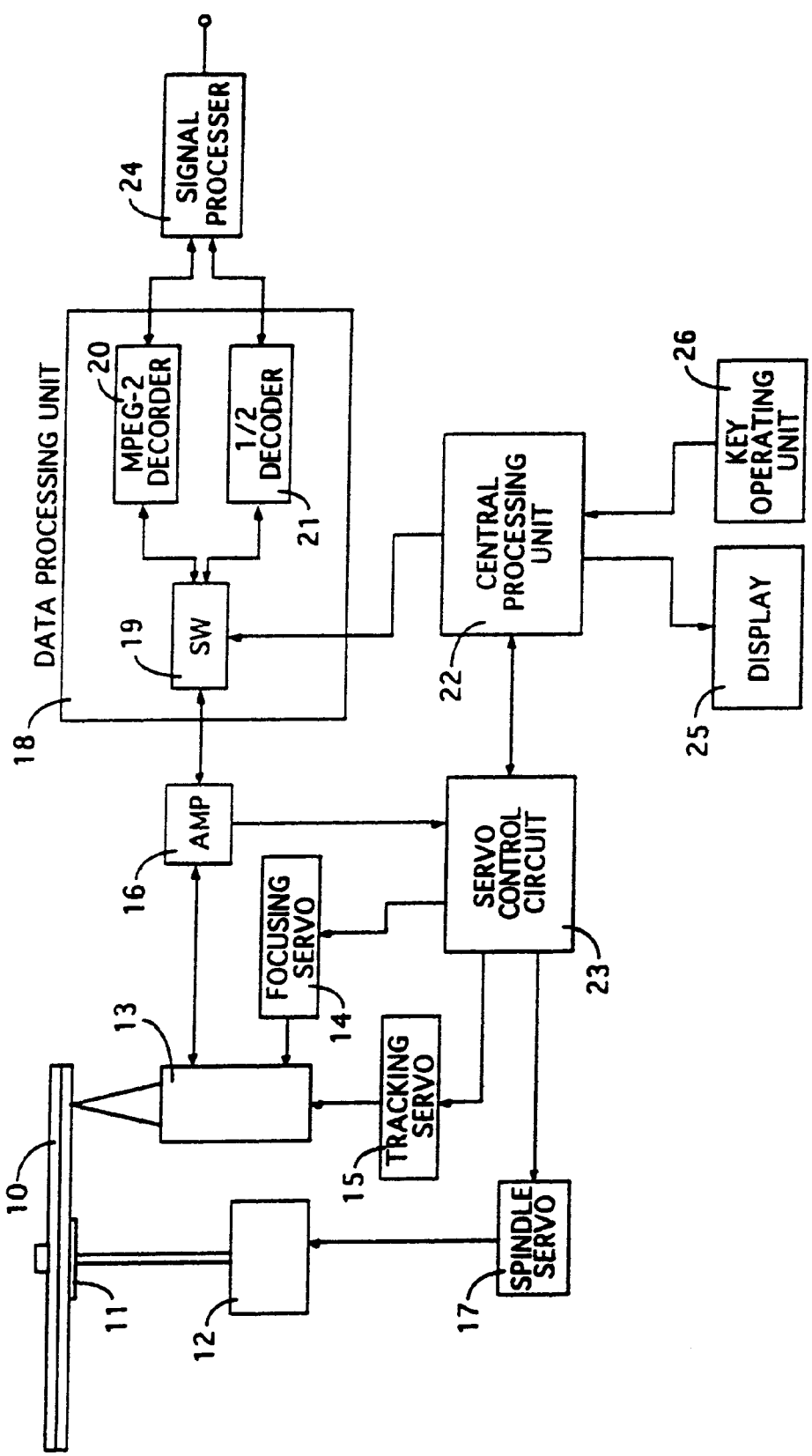
FIG. 1 shows a block diagram of an example of an optical data recording and reproducing apparatus to which the present invention can be applied.

FIG. 1 shows a block diagram of a first example of an optical data recording and reproducing apparatus to which the present invention can be applied. A digital video disk (DVD) 10 which has more than two data layers is mounted on and secured by a turntable 11 to be rotated by a spindle motor 12. Encoded pits on the DVD 10 are read by a pickup 13 which includes a laser diode, a focusing lens, a focusing lens actuator, a tracking actuator and a photo-detector. The movement of the pick-up 13 is controlled by a focusing servo circuit 14 and a tracking servo circuit 15.

To reproduce data encoded on the DVD 10, the output signal from the pickup 13 is transmitted to an amplifier 16. According to a focusing error signal, the focusing servo circuit 14 modulates the focusing lens actuator to move the focal point of the laser beam emitted from the laser diode by moving the focusing lens, to access one of the data layer of the DVD 10. And according to a tracking error signal, the tracking servo circuit 15 modulates the tracking actuator to control position of the pickup 13. The spindle servo circuit 17 modulates the spindle motor 12 in order to track linear velocity of the DVD 10.

The detected signal by the pick-up 13 is amplified by the amplifier 16. And the amplified signal is transmitted to a data processing unit 18 which is composed of a routing switch 19, an MPEG-2 decoder 20 and a ½ decoder 21. The MPEG-2 decoder 20 is a standardized data encoding or decoding circuit for a Digital Video Disk (DVD), provide in order to encode a data signal for recording on the disk and to decode the read out signal for signal processing. The ½ decoder 21 is a data encoding or decoding circuit provided to encode and compress the applied data signal to half data rate of the standardized DVD format. Due to the data compression by the ½ decoder 21, the quality of the data must be sacrificed in order to record longer data per recording area. However, it is possible to provide additional functionally and flexibility for the user. A set of TOC data encoded at a read-in region of the DVD 10 must include the data indicative of the starting and ending position of each data portion, and the data compression rate of each data. The TOC data is reproduced right after the DVD is loaded, and then the each data reproduction is proceded by referring the TOC data. And the TOC data must be rewritten after new data is recorded.

The routing switch 19 is operated by a central processing unit (CPU) 22 according to the detected TOC data, which includes the data indicating the compression rate of each data to determine appropriate decoding circuit. The TOC data is also transmitted to a servo control circuit 23 which modulates the focusing servo circuit 14, the tracking servo circuit 15 and the spindle servo circuit 17. The servo control circuit 23 modulates each servo circuit to access to selected data according to the TOC data which includes the data indicating the starting and ending positions of each encoded data portion. Then the decoded signal is transmitted to a signal processor 24 to transmit the reproduced data signal to any connected unit such as a display system or sound system. The CPU 22 is operated by an operation signal from a key operating unit 26 which transmits all operating singles input by an operator. The CPU 22 also controls a display unit 25 to show the operating status to the operator.

To record data onto the DVD 10, a portion of an input data signal is transmitted from the signal processor 24 to the chosen decoder in the data processing unit according to the operator's command. The input data signal is encoded by the selected decoder, then recorded by the pick-up 13 which is driven by the each servo circuit and the servo control circuit 23. After the new data is recorded on the DVD 10, the TOC data is rewritten to store the data indicating position and data compression rate of the newly recorded data.

In addition, by storing the data of read-in and readout position of the all recorded data as TOC data, a capability of quick random access to any data portion is provided for the data reproduction process. For example, in order to reproduce one data and another data continuously, the pick-up head can rapidly switch access from readout region of the first data to the read-in region of the second data, if data as to all of the read-in region's position is stored and recorded in the TOC data. In the prior art system, all of the read-in region of the data between the first and second data must be counted by detecting the readout signal. For example, in order to reproduce both a 4th data element and a 14th data element recorded on the disk, the pick-up must detect and count ten read-in regions of the data between 4th and 14th data regions by moving the pick-up all over the disk. The present invention can provide the advantage of reproducing the data continuously without timelag. The advantage may contribute remarkably to the multi-layered optical disk reading systems which is equipped with more than two data layers.

Figure 2:
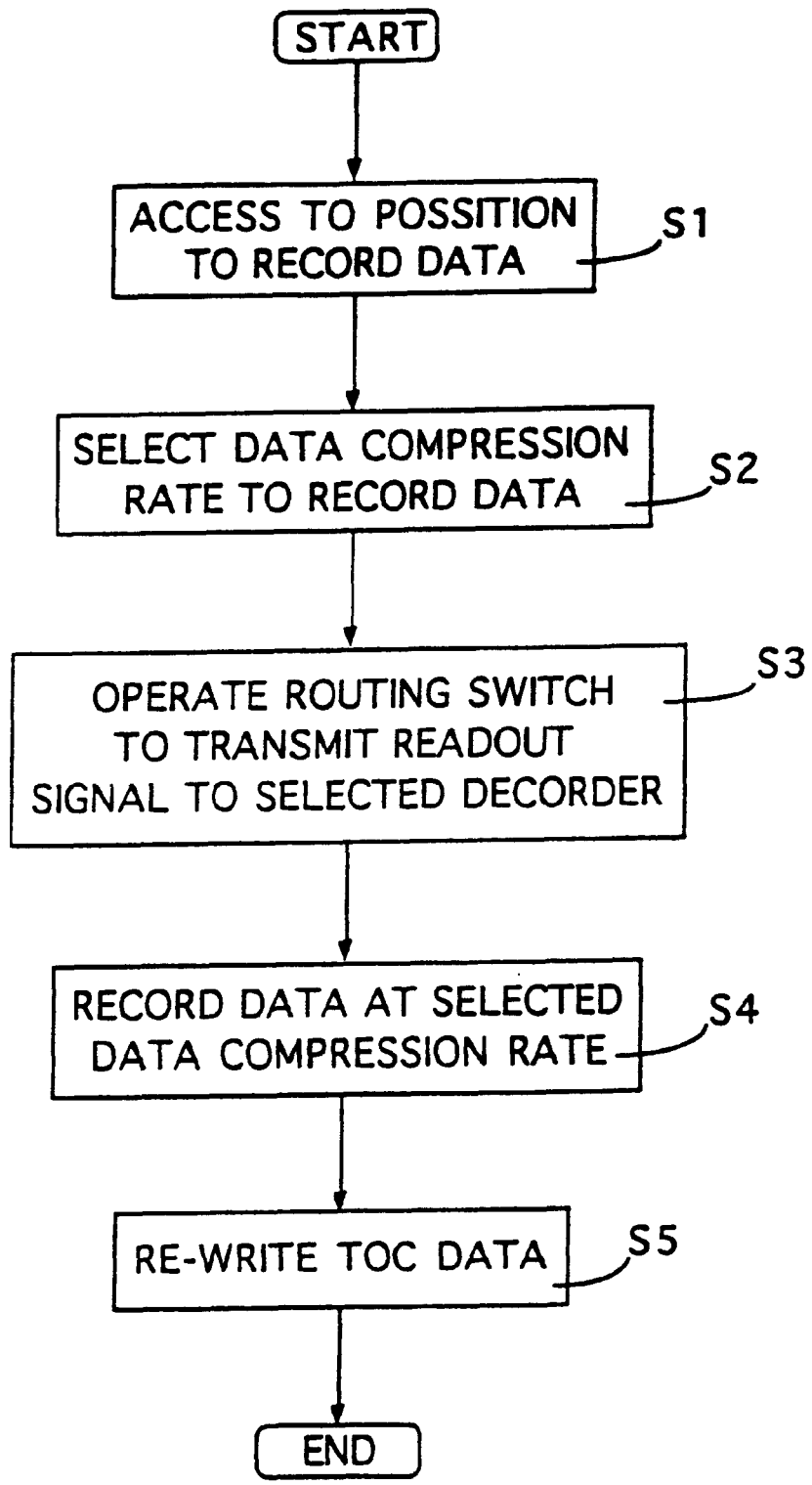
FIG. 2 shows a flowchart for a description of an optical disk recording method of the present invention.

FIG. 2 shows a flowchart of operation processing in a central processing unit (CPU), while recording data onto one data layer of a multi-layered optical disk. After a multi-layered optical disk which has M data layers (wherein M is an integer greater than 1) is loaded, the CPU receives an operator's signal to record data on the Nth data layer of the multi-layered optical disk (wherein N is an integer greater than 1 and not greater than M). The CPU operates a servo control circuit to dispose a pick-up in order to access read-in region of the data to be recorded (Step 1:S1). According to the operator's selection of a data compression rate (S2), the CPU operates a routing circuit to transmit the data the determined encoding circuit in order to compress the data at the selected data compression rate (S3). The CPU operates a servo control circuit to record the data on a predetermined position at the predetermined data compression rate (S4). After the data recording is completed, the CPU operates a servo control circuit to rewrite a total of contents (TOC) data to record data indicating the compression rate of the newly recorded data (S5).

Figure 3:
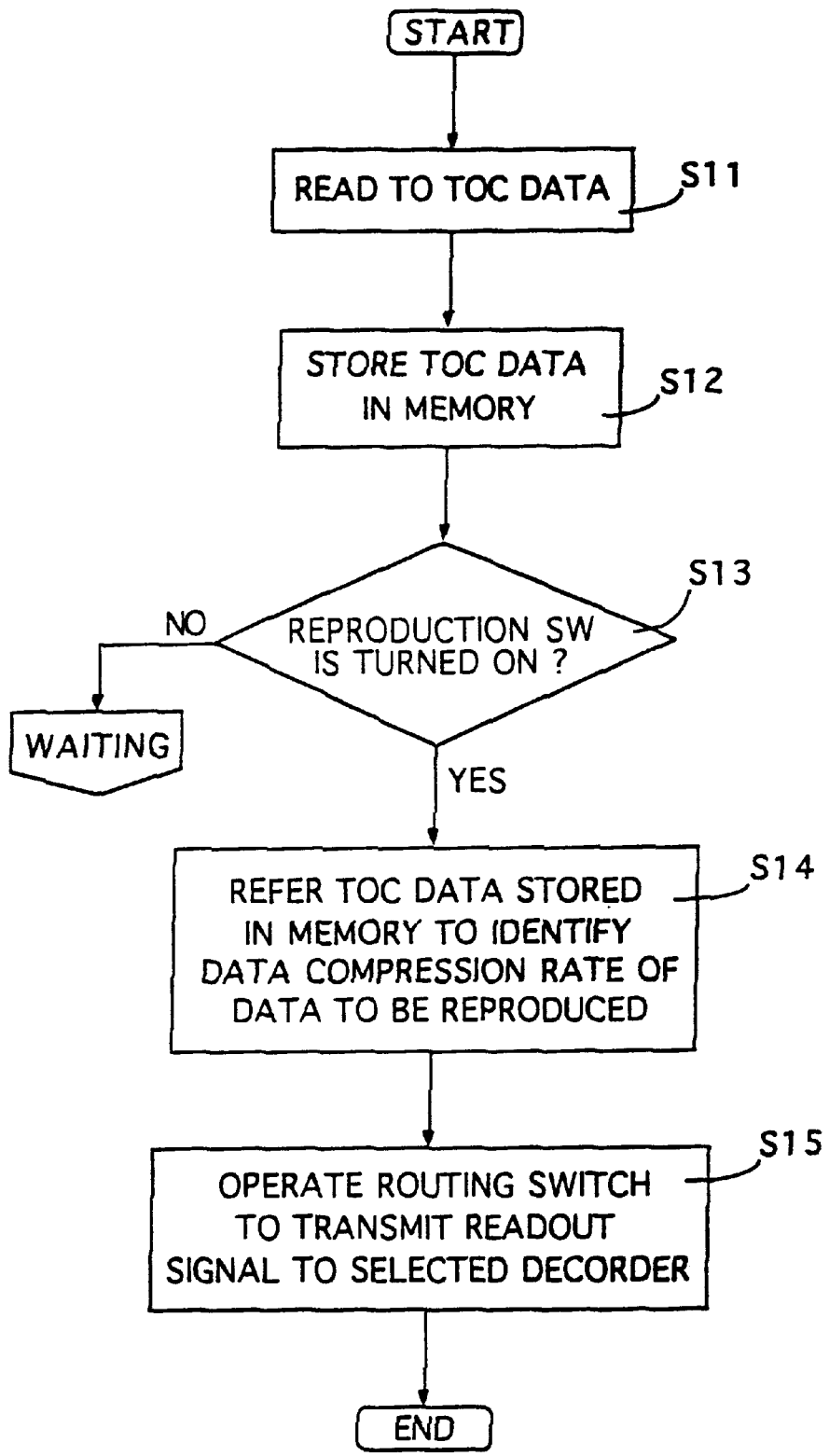
FIG. 3 shows a flowchart for a description of an optical disk reproducing method of the present invention.

FIG. 3 shows a flowchart of an operation processing in the CPU, while reproducing data which is recorded by the procedure described with reference to FIG. 2. After a multi-layered optical disk which has M data layers, wherein M is an integer greater than 1 is loaded, the CPU operates the servo control circuit to reproduce total of contents (TOC) data recorded in the multi-layered optical disk (S11). Then the CPU stores the reproduced TOC data in a memory (S12). When the CPU receives an operator's signal to reproduce certain data from the optical disk (S13), the CPU refers to the TOC data stored in the memory to identify the data compression rate of the selected data (S14). Then the CPU operates the routing switch to transmit a readout signal of the selected data to a determined encoding circuit in order to decompress the selected data (S15). After all of these procedures are completed, the data reproduction is started.

Although the invention has been particularly shown and described, it is contemplated that various changes and modification may be made without departing from the scope of the invention as set forth in the following claims.

What is claimed is:

1. A method usable with a multilayered optical disk, comprising:
   i) selecting a data encoding technique and designating a layer and designating a location of the disk in which input data is to be stored;
   ii) routing the input data to a data encoder;
   iii) encoding the input data in accordance with the selected data encoding technique;
   iv) recording the encoded data onto the designated location; and
   v) rewriting a table of contents data onto the disk to indicate the layer, the location and the selected data encoding technique.

2. The method of claim 1, wherein the optical disk comprises a DVD disk.

3. A method usable with an optical disk, comprising:
   i) retrieving a table of contents data from the disk;
   ii) storing the retrieved table of contents data into a memory;
   iii) from the table of contents data stored in the memory, identifying a data encoding technique and a layer and a location in which recorded data is stored;
   iv) reading out and routing the recorded data at the identified layer and the identified location to a data decoder; and
   v) decoding the read out recorded data in reference to the identified data encoding technique.

4. The method of claim 3, wherein the optical disk comprises a DVD disk.

5. An article comprising a storage medium readable by a processor-based system, the article storing instructions to cause a processor to:
- i) select a data encoding technique and designate a layer and a location of an optical disk in which input data is to be stored;
- ii) route the input data to a data encoder;
- iii) encode the input data in accordance with the selected data encoding technique;
- iv) record the encoded data onto the designated layer and the designated location; and
- v) rewrite a table of contents data onto the disk to indicate the designated layer, the designated location and the selected data encoding technique.

6. The article of claim 5, wherein the optical disk comprises a DVD disk.

7. An article comprising a storage medium readable by a processor-based system, the article storing instructions to cause a processor to:
- i) retrieve a table of contents data written on an optical disk;
- ii) store the retrieved table of contents data into a memory;
- iii) from the table of contents stored in the memory, identify a data encoding technique, a layer and a location in which a recorded data is stored;
- iv) read out and route the recorded data at the identified layer and the identified location to a decoder; and
- v) decode the read out recorded data in reference to the identified data encoding technique.

8. The article of claim 7, wherein the optical disk comprises a DVD disk.

9. A computer system comprising:
- an optical disk drive adapted to receive an optical disk; and
- a processor coupled to the optical disk drive and adapted to:
  - i) select a data encoding technique, designate a layer and designate a location of an optical disk in which input data can be stored;
  - ii) encode the input data in accordance with the selected data encoding technique;
  - iv) record the encoded data onto the designated layer and the designated location; and
  - v) rewrite a table of contents data onto the disk to indicate the designated layer, the designated location and the selected data encoding technique.

10. The article of claim 9, wherein the optical disk comprises a DVD disk.

11. A computer system comprising:
- an optical disk drive adapted to receive and optical disk; and
- a processor coupled to the optical disk drive and adapted to:
  - i) retrieve a table of contents data written on an optical disk;
  - ii) store the retrieved table of contents data into a memory;
  - iii) from the table of contents data stored in the memory, identify a data encoding technique and a layer, and location in which a recorded data;
  - iv) read out and route the recorded data at the identified layer and the identified location to a data decoder; and
  - v) decode the read out recorded data in reference to the identified data encoding technique.

12. The article of claim 11, wherein the optical disk comprises a DVD disk.

* * * * *

UNITED STATES PATENT AND TRADEMARK OFFICE
CERTIFICATE OF CORRECTION

PATENT NO. : 6,215,743 B1
DATED : April 10, 2001
INVENTOR(S) : Yasuo Kamatani

It is certified that error appears in the above-identified patent and that said Letters Patent is hereby corrected as shown below:

Column 3,
Line 34, change "singles" to -- signals --.

Column 6,
Line 19, replace "and" with -- an --.
Line 27, remove the "," after layer.

Signed and Sealed this

Second Day of October, 2001

Attest:

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,215,743 B1
DATED : April 10, 2001
INVENTOR(S) : Yasuo Kamatani

It is certified that error appears in the above-identified patent and that said Letters Patent is hereby corrected as shown below:

<u>Column 6,</u>
Line 16, replace "article" with -- computer system --.
Line 27, replace "a" with -- is --.

Signed and Sealed this

Thirteenth Day of May, 2003

JAMES E. ROGAN
*Director of the United States Patent and Trademark Office*